United States Patent [19]
Bilhorn

[11] Patent Number: 4,976,904
[45] Date of Patent: Dec. 11, 1990

[54] METHOD AND APPARATUS FOR CONTINUOUS FORMATION OF FIBRILLATED POLYMER BINDER ELECTRODE COMPONENT

[75] Inventor: John M. Bilhorn, Stonington, Conn.

[73] Assignee: Energy Research Corporation, Danbury, Conn.

[21] Appl. No.: 341,564

[22] Filed: Apr. 20, 1989

[51] Int. Cl.$^5$ .............................................. B29C 47/44
[52] U.S. Cl. ..................................... 264/104; 264/122; 264/127; 264/211.23; 264/349; 264/DIG. 47; 425/202; 425/204; 425/208; 425/209; 425/382.3
[58] Field of Search ............... 264/104, 122, 211, 349, 264/211.21, 127, DIG. 47; 425/202–209, 382.3, 382.4

[56] References Cited

U.S. PATENT DOCUMENTS

| | | | |
|---|---|---|---|
| 3,317,956 | 5/1967 | Lippens | 425/207 |
| 3,389,201 | 6/1968 | Alsup et al. | 264/211 |
| 3,480,997 | 12/1969 | List | 425/207 |
| 3,595,533 | 7/1971 | Sutter | 425/202 |
| 4,071,946 | 2/1978 | Nilsson | 29/623 |
| 4,124,747 | 11/1978 | Murer et al. | 429/210 |
| 4,216,045 | 8/1980 | Morioka | 264/104 |
| 4,223,080 | 9/1980 | Auborn | 429/194 |
| 4,320,184 | 3/1982 | Bernstein et al. | 429/217 |
| 4,320,185 | 3/1982 | Bernstein et al. | 429/217 |
| 4,379,772 | 4/1983 | Solomon | 264/122 |
| 4,396,693 | 8/1983 | Bernstein et al. | 429/217 |
| 4,556,618 | 12/1985 | Shia | 429/217 |
| 4,573,799 | 3/1986 | Anders | 425/203 |
| 4,708,623 | 11/1987 | Aoki et al. | 425/202 |
| 4,717,505 | 1/1988 | Delphin et al. | 252/511 |
| 4,731,310 | 3/1988 | Anderman et al. | 429/194 |
| 4,735,875 | 4/1988 | Anderman et al. | 429/194 |

FOREIGN PATENT DOCUMENTS

| | | | |
|---|---|---|---|
| 209356 | 7/1983 | Czechoslovakia . | |
| 0146764 | 7/1985 | European Pat. Off. | 85/27 |
| 2121305 | 9/1972 | Fed. Rep. of Germany | 425/204 |
| 2749101 | 5/1979 | Fed. Rep. of Germany | 264/349 |

Primary Examiner—Jeffery Thurlow
Attorney, Agent, or Firm—Robin, Blecker, Daley & Driscoll

[57] ABSTRACT

Electrode materials containing active material in a fibrillated polymer binder are formed continuously into a cohesive electrode component by utilizing a barrel for processing the electrode materials. A mechanism is provided in the barrel for axially advancing the electrode materials, while mixing and kneading the materials to fibrillate the polymer binder. A forming means at the end of the barrel receives the resultant mixture and continuously forms a cohesive component of fibrillated polymer binder and active material as other electrode materials continue to be advanced and processed in the barrel.

34 Claims, 8 Drawing Sheets

FIG. 1

FIG. 4A
RETRACTED POSITION

FIG. 4B
EXTENDED POSITION

Extruded Ni-electrode material

Roll kneaded Ni-electrode material
3000 X

FIG. 7B

Roll kneaded Ni-electrode material
3000 X

METHOD AND APPARATUS FOR CONTINUOUS FORMATION OF FIBRILLATED POLYMER BINDER ELECTRODE COMPONENT

BACKGROUND OF THE INVENTION

This invention relates to a method and apparatus for forming electrode components and, in particular, electrode components comprised of a fibrillated polymer binder which holds the electrode active material.

Electrodes which employ a fibrillated polymer binder for holding the electrode active material are known in the art. These electrodes are used in fuel cells and batteries and usually employ polytetrafluorethylene (PTFE) as the polymer binder. To ensure proper operation of the electrode, the weight percent of the polymer binder is normally selected to be less than the combined weight percent of the active and other materials of the electrode. Thus, for battery electrodes, the polymer binder is usually less than about 10 weight percent of the combined component materials making up the electrode and for fuel cells less than about 50 weight percent.

In the formation of electrodes of this type, the usual practice is to first mix the active material, polymer binder and any other component materials in a batch type process during which the materials are placed in a mixer and the polymer is subjected to high shear stresses. These shear stresses cause the desired fibrillation of the polymer binder and a product results which is an intimate mixture of the fibrillated polymer, active material and other components.

Following this batch processing, the mixture is shaped and formed as desired. If the material is to be formed as a sheet, this can be carried out by pressing the mixture or calendering same. Alternatively, the mixture can be extruded to any shape and then cut into sheets.

Czechoslovakian Patent No. 209,356 discloses another type of process for forming electrodes of this type in which a mixture of active material, a liquid plasticizer and a plastic bonding agent is formed and extruded through an extruder nozzle at normal temperature to form an electrode tube. In this process, the size and shape of the plastic binder particles are such that during the extruding process the particles are geometrically oriented into a fiber like shape which gives mechanical strength and optimum ion exchange properties to the electrode tube.

While these procedures of electrode formation provide the desired electrodes, efforts are still underway to develop quicker and less labor intensive procedures which result in electrodes with enhanced and more controllable fibrillation of the polymer binder.

It is, therefore, a primary object of the present invention to provide a method and apparatus for forming a cohesive fibrillated polymer electrode component in which processing time is minimized while component integrity and performance are enhanced.

It is a further object of the present invention to provide a method and apparatus for forming a cohesive fibrillated polymer electrode component such that the formation process can be carried out continuously.

It is yet a further object of the present invention to provide a method and apparatus for forming a cohesive fibrillated polymer electrode component in which fibrillation of the polymer can be controlled and enhanced.

SUMMARY OF THE INVENTION

In accordance with the principles of the present invention, the above and other objectives are realized in a practice in which the electrode materials, including the active material and polymer binder, are processed so as to fibrillate the polymer binder as the electrode materials are being moved through an elongated barrel. The elongated barrel directly feeds the processed materials to a forming means which forms the processed materials into a cohesive fibrillated polymer electrode component. This occurs as other electrode materials are being moved along and processed in the barrel.

An advancing and processing means situated in the barrel moves the electrode materials axially toward the forming means as the materials are mixed and kneaded. This provides the binder material with a desired degree of fibrillation by the time the material is advanced to the forming means. Continued advancement of the mixed electrode materials with the fibrillated polymer binder to and through the forming means then results in the continuous formation of a cohesive structure with fibrillated binder to provide the electrode component.

In the embodiment of the invention to be disclosed hereinafter, the advancing and processing means includes a screw which both rotates and reciprocates. The screw is provided with broken or discontinuous flites some of which are adapted to primarily advance or push the electrode materials along the screw axis and others of which are adapted to primarily mix and knead the material to create shear stresses necessary for fibrillation of the polymer binder Pins are also situated at preselected positions along the barrel and cooperate at least with the kneading flites to create a wiping action which facilitates fibrillation of the polymer.

In this embodiment, the forming means comprises a hob and a surrounding die which are so configured that the so-called "adapter" and "smoothing" zones of the hob and die result in the desired cohesive component. Furthermore, the hob is connected to the screw so as to follow its reciprocating motion but not its rotating motion.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
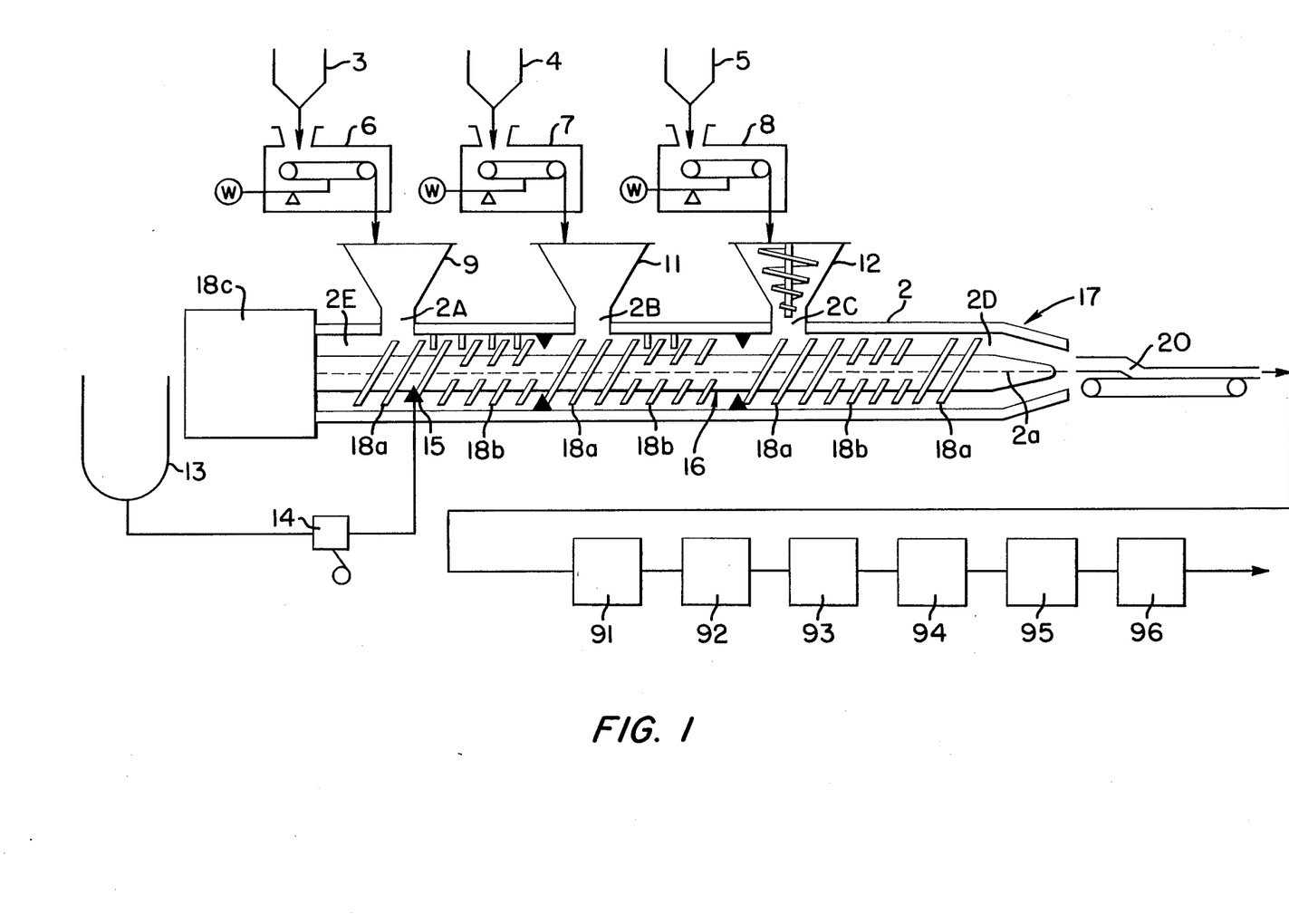
FIG. 1 shows schematically an apparatus for continuously forming an electrode component in accordance with the principles of the present invention.

FIG. 1 shows an apparatus 1 for forming a cohesive electrode component in accordance with the principles of the present invention. The electrode component is to be formed from an active material, a polymer binder such as PTFE, and possibly other materials which are freely flowable. The weight percent of polymer binder, as compared to the total weight percent of the other electrode materials, will depend upon the particular electrode being formed In general, the weight per cent of the electrode polymer binder will be less than about 10 percent so that the mixture is predominately active material and other components.

Specifically, as above-indicated, if the electrode component is to be used in a battery electrode, the weight percent of polymer is preferably less than about 5 percent. In the case of nickel and cadmium batteries, the weight percent is more preferably less than about 4 percent. For fuel cell electrodes, on the other hand, as also above-indicated, the weight percent is preferably less than about 50 percent.

The active material can be any active material generally used as an active material in the formation of electrodes. Thus, the active material might be nickel, cadmium, zinc, lead, mercury, silver, manganese dioxide, molybdenum oxide or vanadium pentoxide. The other component materials added to the active and polymer binder materials might be conductive diluents, softening agents, pore formers, bulking agents. Typical additive materials might be mineral spirits, graphite, metal powder and isopropyl alcohol.

In accordance with the principles of the invention, the apparatus 1 comprises a barrel 2 arranged horizontally for receiving the electrode materials. These materials may be fed to the barrel 2 from a common feed, after they have been premixed, or from separate feeds as shown in FIG. 1. In particular, in FIG. 1, hoppers 3, 4 and 5 are situated along the axis 2a of the barrel 2 and deliver, respectively, polymer binder, active material and conductive diluent to a set of associated weight loss feeders 6, 7, 8.

The latter feeders, in turn, deliver metered amounts of their respective materials to gravity feed funnels 9 and 11 and screw feed funnel 12, respectively. The latter type funnel is needed for certain conductive diluents, since they may not gravity feed as easily as the binder and active materials and may have to be mechanically advanced. The funnels 9, 11 and 12 communicate with respective ports 2A, 2B and 2C in the barrel 2 so that polymer binder, active material and conductive diluent are delivered through the ports into the barrel interior.

In the present illustrative case, a tank 13 also provides to the barrel 2 solvent for softening the polymer binder during the forming process. Metered amounts of this solvent are introduced into the barrel 2 adjacent the position of feeding the polymer. This is accomplished via a metering pump 14 and an open pin feed 15.

In further accord with the invention, the barrel 2 is provided in its interior with a mechanism 16 which pushes or advances axially the electrode materials introduced into the barrel, while at the same time mixing and kneading the materials so as to fibrillate the polymer binder. The pushing mechanism 16 advances the mixture of materials including the fibrillated binder to a forming means 17 disposed at the forward or downstream end 2D of the barrel. The forming means 17, in turn, is specifically adapted to form from the mixture of fibrillated binder and electrode materials a cohesive electrode component 20 as the mixture is continuously advanced axially through the action of the mechanism 16.

As shown, the pushing mechanism 16 comprises a screw 18 which is mounted so as to extend along the axis 2a of the barrel 2. A drive 18c mounted at the rear or upstream end 2E of the barrel drives the screw 18 so that it undergoes both rotating and reciprocal motion relative to the barrel axis.

Distributed along the length of the screw 18 are one or more sets of pushing or advancing flites 18a and one or more sets of kneading and mixing flites 18b. Each set of pushing flites 18a is adapted to provide predominately axially advancing action to the electrode materials in the barrel as the screw 18 is rotated and reciprocated, while each set of kneading flites 18b is adapted to provide predominately mixing and kneading action to the materials.

Figure 2A:
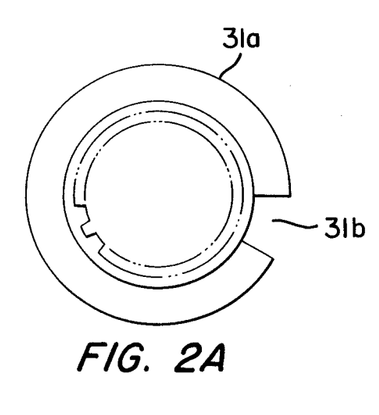
FIGS. 2A and 2B show front and side views of a pushing or advancing element used with the screw of the apparatus of FIG. 1.
Figure 2B:
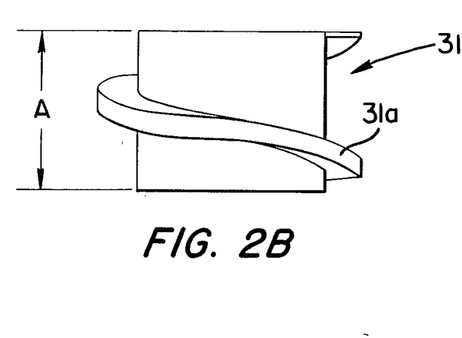

FIGS. 2A and 2B illustrate front and side views of a basic pushing element 31 which can be used with like elements to realize the sets of pushing flites 18a. The element 31 comprises a single, angled flite 31a which is broken at a position 31b.

Figure 3A:
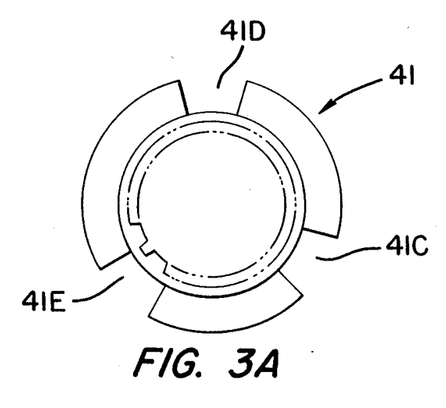
FIGS. 3A and 3B show front and side views of a kneading element used with the screw of the apparatus of FIG. 1.
Figure 3B:
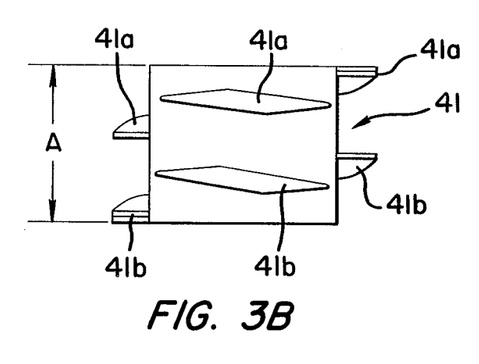

Similar views of a kneading element 41 are shown in FIGS. 3A and 3B. The kneading element 41 comprises two flites 41A and 41B which are also broken, but at three positions 41C, 41D and 41E. As can be seen, the angle of the kneading flites is much shallower than that of the pushing flites so that there are twice as many kneading flites as pushing flites over the same axial length A of the elements 31 and 41. As indicated above, to realize the various sets of flite groups 18a and 18b, a number of elements 31 or 41 may be coupled axially.

In order to facilitate the kneading and mixing action of the kneading flites 18b, the barrel 2 is further provided with three sets 19A, 19B and 19C of like shaped pins 19. The sets of pins 19A, 19B and 19C are spaced circumferentially about the barrel 2 interior and, therefore, only the pin set 19A is observable in FIG. 1. As can be seen from the latter pin set, the pins of a given set are spaced axially along the same line and extend from the barrel radially inwardly to positions closely adjacent the flites.

With this arrangement, as the screw 18 rotates, each flite of the of the kneading flite groups 18b rotates in close proximity to at least one of the pins 19 of the pin sets. The pins, therefore, are continuously wiping past the flites of the flite groups and this wiping action subjects the polymer binder material to the shear stresses needed to fibrillate the binder. The desired fibrillation of the binder thus results.

It should also be noted that the rotating and reciprocating motion of the screw 18 is timed such that axial motion of a flite passed an adjacent pin always occurs when the pin is aligned with a break in the flite. The breaks in the flites thus accomodate the reciprocating motion of the screw.

Figure 4A:
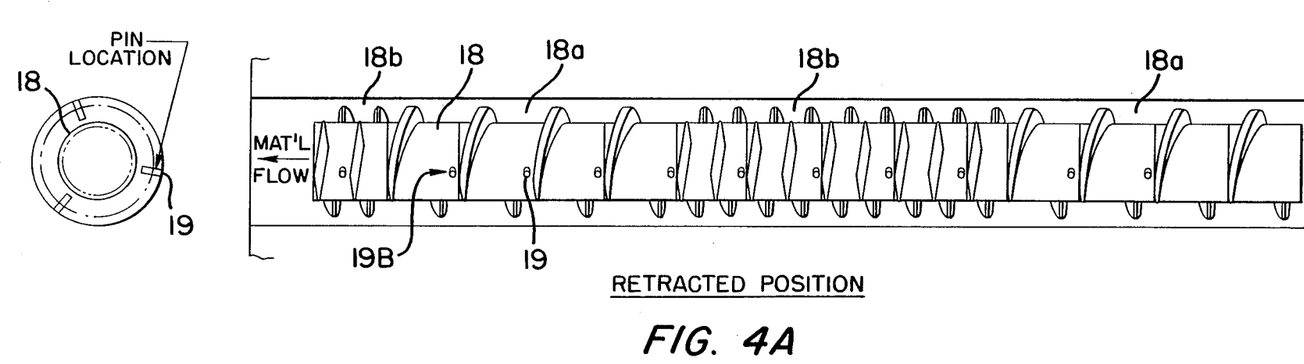
FIGS. 4A and 4B show the screw of the apparatus of FIG. 1 in its retracted and extended positions, respectively.
Figure 4B:
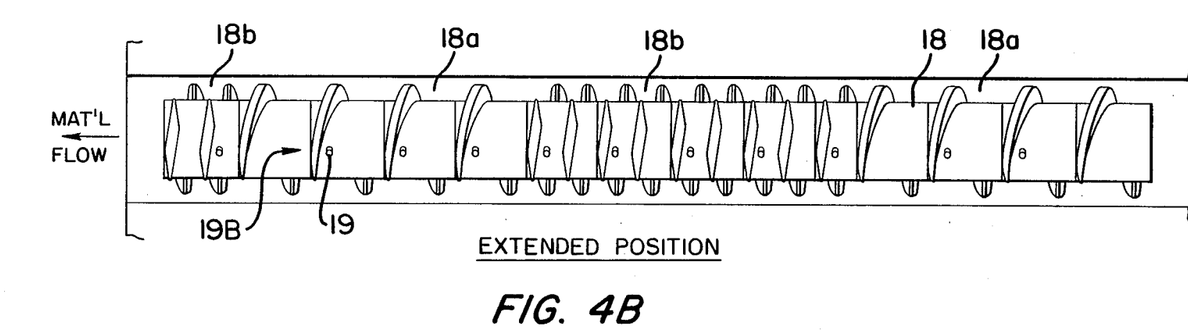

FIGS. 4A and 4B show a screw 18 with a representative grouping of pushing and kneading flites 18a and 18b in relationship to the pins of the pin set 19B. FIG. 4A illustrates the relative position of the elements when the screw 18 is in its retracted position. FIG. 4B, in turn, illustrates this relationship with the screw in the fully extended position. As can be appreciated, due to the incline and shaping of the kneading flites, the close proximity relationship between the pins and these flites is maintained during the full motion of the screw. This ensures the above-discussed shear stresses and resultant polymer fibrillation.

As above-indicated, the mixture of fibrillated polymer binder and electrode materials is carried by the action of the screw 18 and the advancing flite groups 18a from the barrel 2 to and through the forming means 17 which forms the mixture into the cohesive electrode component 20. In the present case, the forming means 17 is adapted to develop such cohesive component without the binder being brought to the melt stage. As a result, the barrel 2 need not be heated to melt the binder, although the barrel 2 may be subjected to low heating (e.g., 150° F.) so as to faciliate the softening action of the solvent on the binder.

Figure 5A:
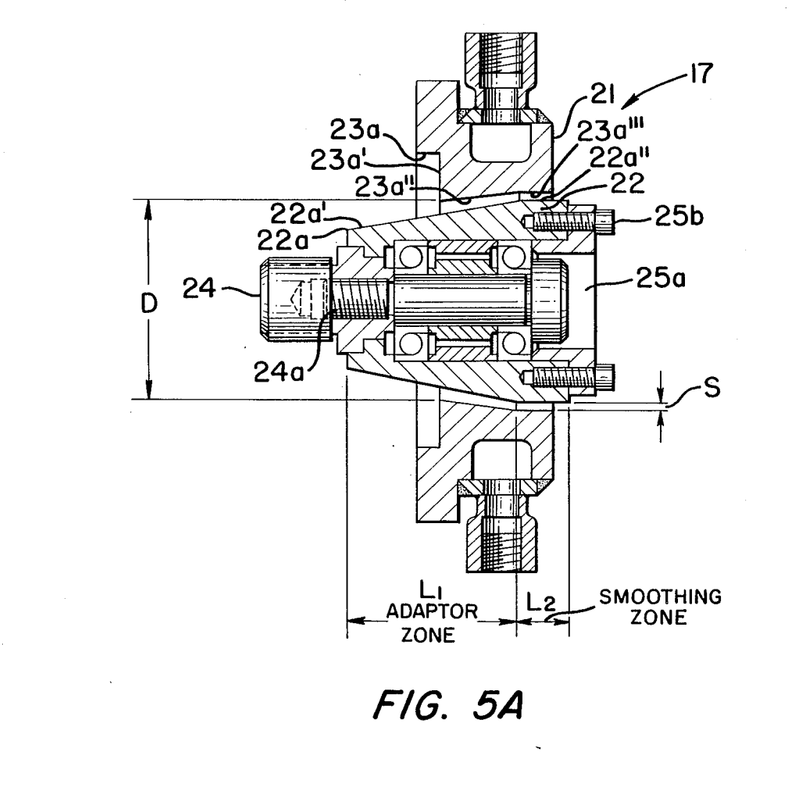
FIGS. 5A and 5B show cross section and front views of a hob and annular die usable as the forming means of the apparatus of FIG. 1.
Figure 5B:
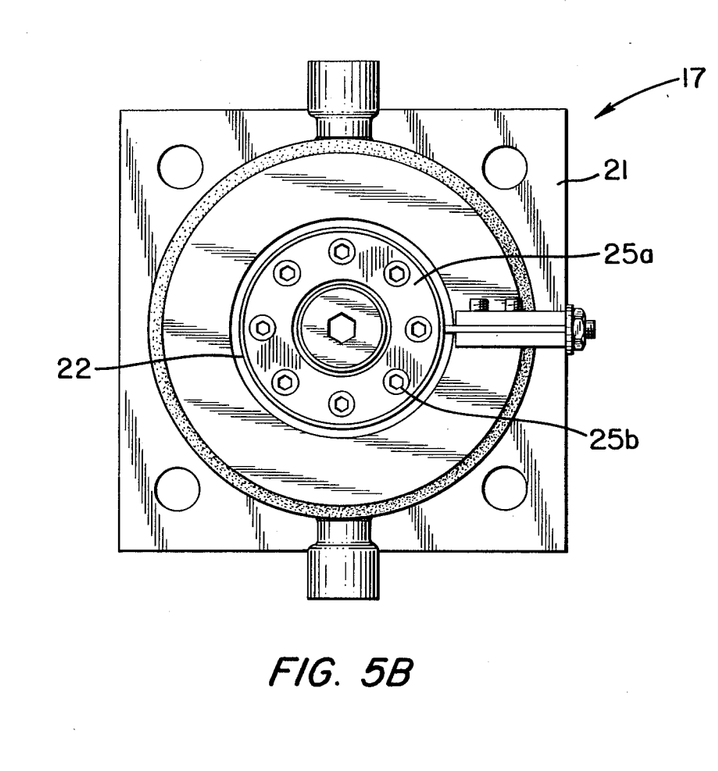

FIGS. 5A–5B, illustrate a forming means 17 which is configured to develop a cohesive component in the form of a tube from the electrode mixture received from the barrel 2. As shown, the forming means 17 comprises a die 21 having an interior or hob member 22 and a cooperating, surrounding outer or die head member 23. The hob has an outer surface 22a which includes a slanting section 22a' of length $L_1$ in the axial direction and a horizontal or land section 22a'' *of length $L_2$.* The die head, in turn, has an inner surface 23a which includes a receiving section 23a' for the barrel 2, a slanting section 23a' with an initial diameter D equal to the barrel 2 diameter and a horizontal or land section 23a'''. The land sections 22a' and 23a''' define an annular spacing S which substantially corresponds to the thickness of the tubular electrode component passed from die 21.

In accordance with the invention, to obtain a cohesive component tube of about 2 to 3 inches diameter without melting of the polymer binder and with the preferable weight percent of the binder, it has been found that the length $L_1$, which defines the length of the above-mentioned "adapter zone" of the die 21, should be such that the ration $L_1/D$ is in the range of 0.5 to 0.75 inches. In further accord with the invention, it has also been found that to achieve such component tube, the above-mentioned "smoothing zone", defined by the land sections 22a'' and 23a''', should be such that the ratio $L_2/S$ is equal to or less than about 3.5.

With these ranges for $L_1/D$ and $L_2/S$, the mixture of electrode materials with fibrillated polymer from the barrel 2 is readily formed into the desired cohesive tube. This occurs because the materials are able to pass through the adapter and smoothing zones without excessive shear of the material wall thickness which would otherwise shorten the polymer fibrils. Such shortening of the fibrils inhibits melding of the fibrils as the material is pushed through the die 21 with the motion of the screw 18 and, hence, if allowed to occur would prevent formation of a cohesive structure.

The die 21 is coupled to the screw 18 via a coupling 24. The coupling 24 connects, via a threaded member 24a, to a bearing assembly 25 which is mounted to rotate interiorly of the hob 22 and which includes a bearing cap 25a screwed, via screws 25b, to the die head 21. With this connection, the hob 22 is subjected to the reciprocating motion of the screw 18, but is isolated from the rotating motion. As a result, as the mixture from the barrel 2 is being pushed by the hob through the die 21 it does not impart any twist to the mixture and, therefore, to the resultant tube as it is being formed.

The surfaces 22a and 23a of the die head 22 and hob 23 may be coated to facilitate passage of the mixture from the die. This is desirable because the active material in the mixture may be abrasive. The coating material used should be capable of accepting extreme polish and be of very low coefficient of friction. Typical coatings might be electroless nickel or chrome plating.

By utilizing the barrel 2 and forming means 17, as above-described, the coherent tube 20 of fibrillated polymer and intermixed active and other materials is continuously formed by the forming means 17 as other materials are being processed in the barrel 2. In order to form a cohesive sheet component from the tubular component 20, a cutter 91 arranged to cut the tube wall along its length may be located downstream of the forming means. A converting element 92 following the cutter 91 would then gradually convert the cut tube into a flat sheet. The flat sheet may then be fed to calandering rollers 93 to realize a desired thickness for the sheet. The rolled sheet may thereafter be dried in a dryer 94, have its edges trimmed by an edge trimmer 95 and be coiled on a coiler 96 for storage to complete processing of the electrode component.

In the event electrodes are to be formed directly from the sheet without storage, instead of the coiler 96, a further cutter could be arranged to follow the dryer 94 for cutting the continuous sheet into suitable lengths for the desired electrodes. The cut lengths would then be provided with suitable current collectors and possibly other components to complete the electrodes.

Figure 6A:
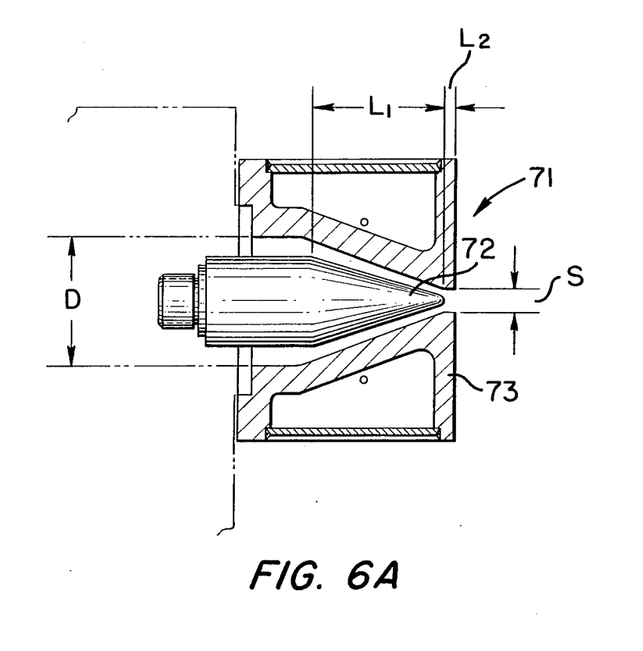
FIG. 6A and 6B show cross section and front views of a hob and slot die usable as the forming means of the apparatus of FIG. 1.
Figure 6B:
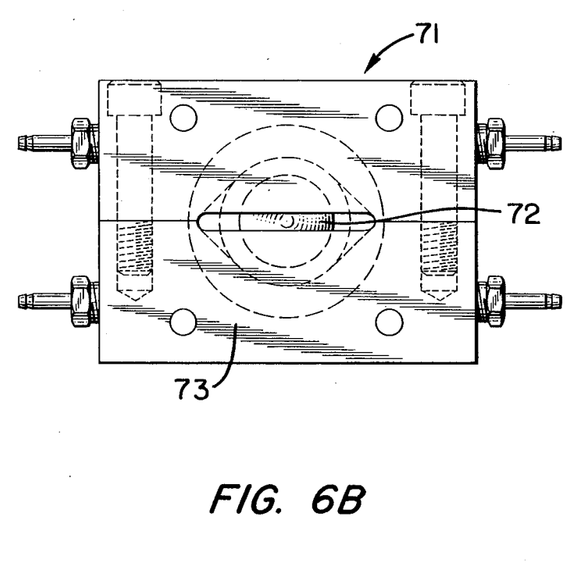

While the discussion above has described the forming means 17 in terms of a die for developing a tubular component which, thereafter, can be formed into a sheet, it is also within the contemplation of the invention to directly form the mixture from the barrel 2 into a sheet by use of a slot die. FIGS. 6A and 6B show cross section and front views of a suitable slot die 71 comprising hob 72 and die head 73. In this case, to obtain a cohesive sheet component of about 4.5 inch width from a 2-inch diameter barrel, the length of the adapter zone $L_1$ of the die is such that the ratio of $L_1/D$ (where D again is the initial diameter of the die 73 surface defining the adapter zone and equal to the barrel diameter) should be less than about 1.25 inches and the length of the smoothing zone is such that the ratio of $L_2/S$ (where S is the height of the slot corresponding to the thickness of the sheet), should be in the range of 3 to 4.

Using the apparatus of the invention, it is has been found that the processing of the electrode components is more controllable, requires fewer steps and the consistency of the material is more uniform as compared to conventional batch type operations which employ existing roll, kneading and extrusion operations which are operator sensitive. Furthermore, it has been found that the amount of fibrillated polymer binder needed to form a cohesive structure is significantly reduced, thus allowing increased amounts of active material to be used and, as a result, to achieve electrodes having greater capacity per unit weight or volume.

Specifically, a 1.5% PTFE Ni positive component formed with the present apparatus has been found to compare favorably with a 4% PTFE roll/kneaded positive component, and to enable formation of an electrode with up to 10% more capacity. An electrode formed from a 1.2% PTFE CdO negative component processed with the subject apparatus has also been found to compare favorably with an electrode formed from a roll/kneaded component containing up to 10% PTFE on long cycling of over 790 cycles with good voltage and stability. Finally, an electrode formed from a 1.5% PTFE nickel positive component and 1.2% PTFE cadmium oxide negative component made with the subject apparatus has been found to show better voltages and stability after 780 test cycles when compared with an electrode formed from a roll/kneaded positive component with 4% PTFE and a negative component with 2% PTFE.

Figure 7A:
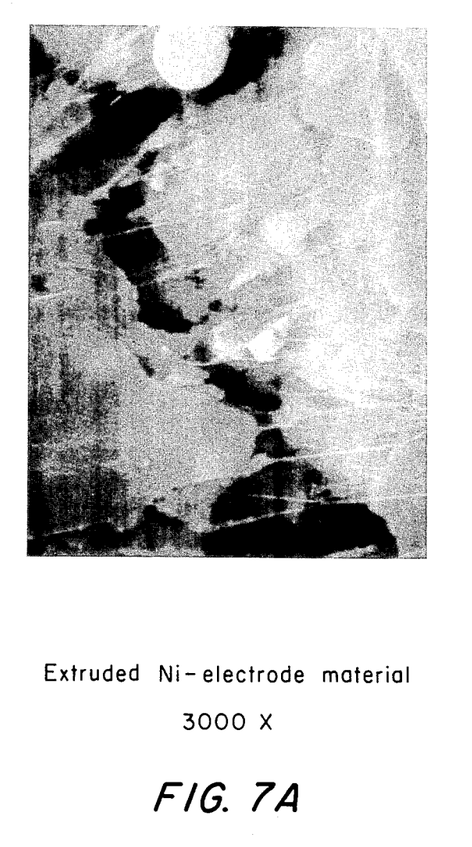
FIGS. 7A–7C show scanning election microscope tracings of an electrode formed with the apparatus of FIG. 1 and electrodes formed by the prior art batch processing methods.
Figure 7B:
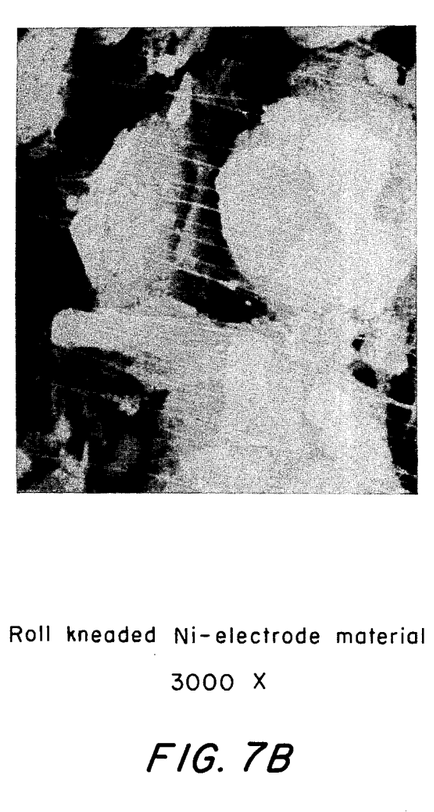
Figure 7C:
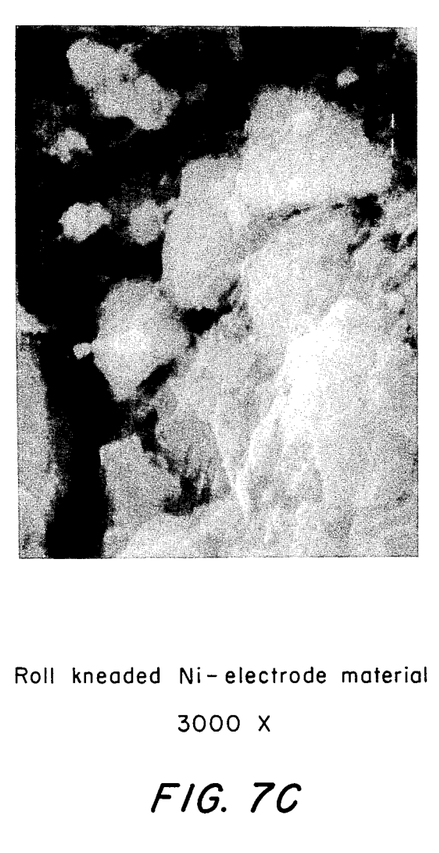

An illustration of the above structures is shown in the attached tracings of SEM photographs taken of a nickel electrode made with the present apparatus, and one made with known batch processing. The nickel-electrode made in accordance with the invention is shown in FIG. 7A at 3000× and includes 1.5% binder (PTFE) whereas the nickel electrode made by batch processing is shown in FIG. 7B at 3000× and includes 4% of the same binder. It can be readily seen that because of the more uniform structure and finer denier of the fibrillation created by the present apparatus, far less binder creates a better structure. The greater uniformity achieved with the present apparatus which produces material of a more consistent quality, may be seen from FIG. 7C, which shows a section of a nickel electrode with 4% binder at 3000× made by the batch processing in which the fibrillated structure is considerably less than in the electrode of FIG. 7B, made by the same process and materials in a different batch.

As can be appreciated, the particular arrangement of pushing and kneading flite groups 18a and 18b, the number flite elements in each group and the location and distribution of the pins 19 to provide kneading to achieve the desired fibrillation of the polymer binder in the barrel 2 will depend upon the particular active material, binder material and other component materials used in the mixture. An off the shelf unit which enables fashioning of the barrel 2 and the screw 18 with various arrangements for the aforesaid elements is a co-kneader manufactured by Buss under model number PR-46. This co-kneader is equipped with kneading and advancing elements as shown in FIGS. 2A, 2B, 3A and 3B which can be axially attached to form different groups of elements as desired. It also has pin locations spaced 120° about the barrel circumference and is provided with pins for inserting in these locations as desired. Accordingly, by suitably arranging the elements and pins in accordance with the above teachings, a unit for achieving electrode components for a variety of polymer binders, active materials and other electrode materials can be realized.

Figure 8:
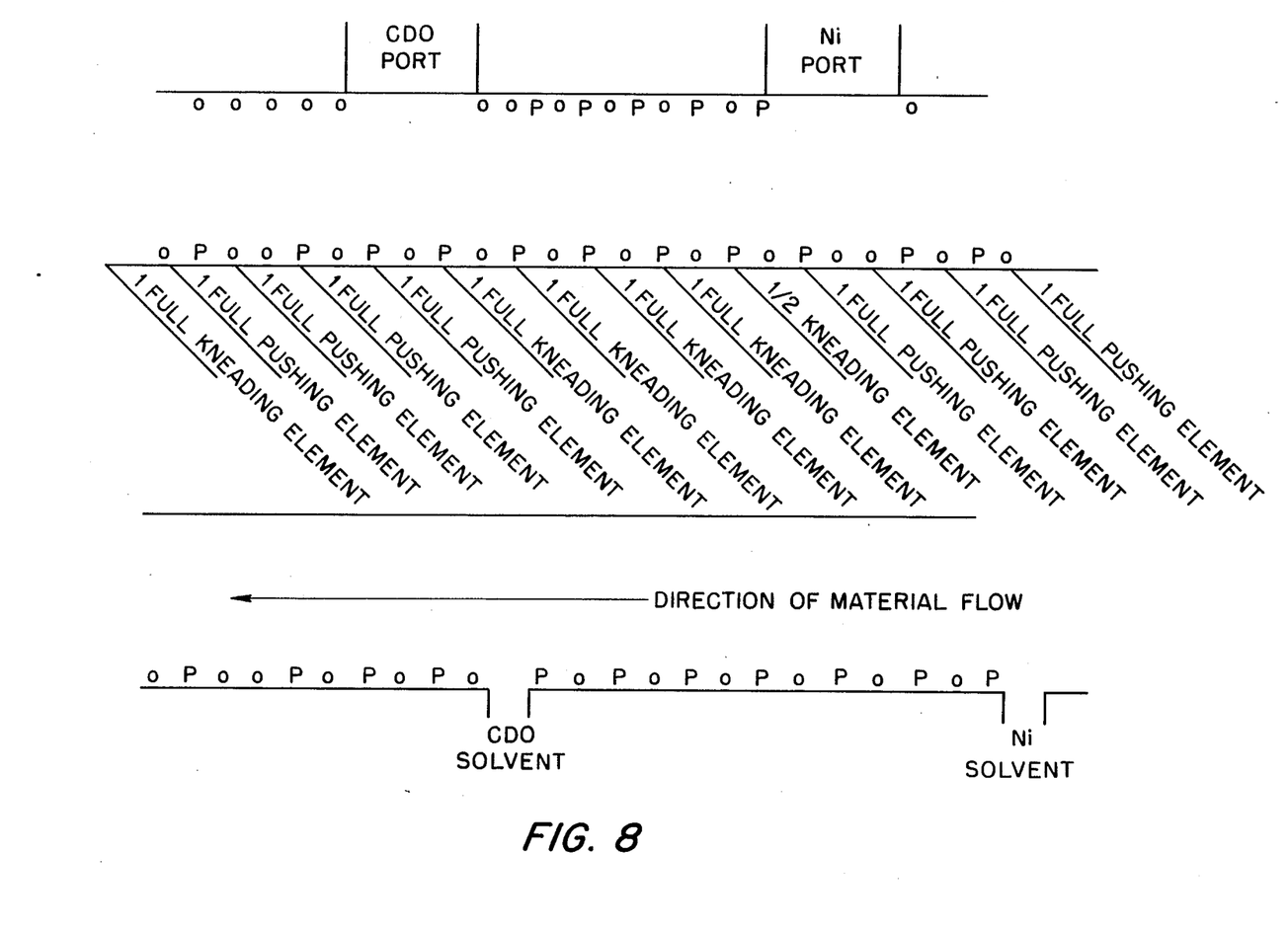
FIG. 8 shows schematically the kneading and advancing element arrangement of the screw and the pin locations of the barrel of an apparatus usable as the apparatus of FIG. 1.

FIG. 8 shows a typical arrangement of pins and kneading elements of a Buss PR-46 kneader for forming coherent tubular components comprised of cadmium oxide and nickel hydroxide active materials and PTFE fibrillated binder. The upper and lower lines in the figure show the positions of the material entry ports and solvent entry ports along the barrel axis for the different materials as well as the pin locations for the first and second sets of pins. The middle line shows the positions of the kneading and advancing elements and the number and makeup of the elements. This line also shows the pin locations of the third set of pins. In the figure a P represents the presence of a pin at the pin location and a 0 the replacement of a pin with a plug which is lies flush with the barrel surface.

As can be seen from FIG. 8, the nickel hydroxide mixture is introduced into the barrel further upstream from the point of introduction of the cadmium oxide mixture so that the former mixture is subjected to a greater degree of kneading. This extra kneading is required for the nickel hydroxide mix due to the lubricating influence of the graphite conductive diluent used in the mix. Alternatively, the cadmium oxide mixture can also be introduced further upstream in the barrel, in which case the kneading elements would be changed to pushing elements with only one kneading element at the discharge end of the barrel.

In all cases, it is understood that the above-identified arrangements are merely illustrative of the many possible specific embodiments which represent applications of the present invention. Numerous and varied other arrangements can readily be devised in accordance with the principles of the present invention without departing from the spirit and scope of the invention.

What is claimed is:

1. Apparatus for use in forming an electrode comprising:
   a barrel for receiving electrode materials comprising an active material and a polymer binder;
   means within said barrel for moving said received electrode materials axially while mixing and kneading said electrode materials such that said polymer binder is fibrillated; and
   means disposed at the end of said barrel and adapted to receive the mixture of electrode materials including said fibrillated polymer binder as said mixture is moved axially in said barrel and to continuously form from said mixture a cohesive electrode component without bringing said polymer binder to the melt stage comprising: a hob member having an outer surface; and a surrounding die having an inner surface; said outer and inner surfaces of said die and hob defining an adapter zone through which said mixture first passes and a smoothing zone following said adapter zone; the ratio of the length of said adapter zone in the axial direction to the barrel diameter being in the range of 0.5 to 0.75 and the ratio of the length of said smoothing zone to the thickness of said cohesive electrode component being less than about 3.5.

2. Apparatus in accordance with claim 1 wherein:
   the amount of polymer binder is less than about 50 percent by weight of the materials constituting said cohesive electrode component.

3. Apparatus in accordance with claim 2 wherein: the amount of polymer binder is less than about 10 percent by weight of the materials constituting said cohesive component.

4. Apparatus in accordance with claim 1 wherein:
   said cohesive electrode component is in the form of a sheet.

5. Apparatus in accordance with claim 1 wherein:
   said cohesive electrode component is in the form of a tube.

6. Apparatus in accordance with claim 5 further comprising:
   means for slitting said tube along its length;
   and means for forming said slit tube into a sheet.

7. Apparatus in accordance with claim 1 further comprising:
   means for feeding said electrode materials into said barrel.

8. Apparatus in accordance with claim 7 wherein:

said means for feeding feeds one or more of said electrode materials into said barrel at different positions along the axis of said barrel.

9. Apparatus in accordance with claim 8 wherein:
said means for feeding includes metering means for separately metering the amounts of electrode materials being fed at the different positions.

10. Apparatus in accordance with claim 7 wherein:
said electrode materials are premixed;
and said feeding means feeds said premixed electrode materials into said barrel.

11. Apparatus in accordance with claim 1 herein:
said outer surface of said hob includes: a first truncated conical surface portion closest said barrel which increases in radius in moving away from said barrel and which with said inner surface of said die forms said adapter zone; and a second cylindrical surface portion which extends from said first surface portion and which forms with said inner surface of said die said smoothing zone which is annular.

12. Apparatus for use in forming an electrode comprising:
a barrel for receiving electrode materials comprising an active material and a polymer binder;
means within said barrel for moving said received electrode materials axially while mixing and kneading said electrode materials such that said polymer binder is fibrillated; and
means disposed at the end of said barrel and adapted to receive the mixture of electrode materials including said fibrillated polymer binder as said mixture is moved axially in said barrel and to continuously form from said mixture a cohesive electrode component without bringing said polymer binder to the melt stage comprising: a hob member having an outer surface; and a surrounding die having an inner surface; said outer and inner surface of said die and hob defining an adapter zone through which said mixture first passes and a smoothing zone following said adapter zone; the ratio of the length of said adapter zone in the axial direction to the barrel diameter being less than about 1.25; and the ratio of the length of said smoothing zone to the thickness of said cohesive electrode component being in the range of about 3 to 4.

13. Apparatus in accordance with claim 12 wherein:
the outer surface of said hob comprises: inclined upper and lower flat surfaces which incline toward the axis of the barrel in proceeding away from the barrel.

14. Apparatus in accordance with claim 1 wherein:
said means for moving is adapted to be reciprocated along the axis of said barrel;
and said hob includes means for coupling said hob to said moving means so said hob reciprocates with said moving means.

15. Apparatus in accordance with claim 14 wherein:
said means for moving is adapted to rotate about the axis of said barrel;
and said coupling means prevents said hob from rotating with said moving means.

16. Apparatus in accordance with claim 1 wherein:
said inner and outer surfaces of said die and hob are coated with materials having a low coefficient of friction and being highly polished.

17. Apparatus in accordance with claim 1 wherein:
said moving means includes: surfaces for contacting said electrode materials and means for passing other surfaces closely adjacent said contacting surfaces so as to create a wiping action which acts to fibrillate the polymer binder material in the region between said contacting surfaces and said other surfaces.

18. Apparatus in accordance with claim 1 wherein:
said moving means comprises: a screw extending along the axis of said barrel, said screw being mounted to reciprocate along and rotate about said axis and having along its length one or more discontinue kneading flites;
a first set of pins situated along the length of said barrel and extending radially inwardly to positions adjacent said flites;
the flites and set of pins being configured and arranged such that as said screw rotates and reciprocates the surfaces of the flites pass closely adjacent said pins so as provide a wiping action, thereby causing kneading of the electrode materials therebetween and resultant fibrillation of the polymer binder material.

19. Apparatus in accordance with claim 18 wherein:
said moving means further comprises: one or more further pushing flites situated along the length of said screw and adapted to push said materials along the axis of said barrel.

20. Apparatus in accordance with claim 19 wherein:
said one or more kneading flites are arranged in groups of one or more flites;
and said one or more pushing flites are discontinuous and arranged in groups of one or more flites.

21. Apparatus in accordance with claim 20 wherein:
the discontinuous nature of said flites defines breaks in said flites which are arranged to allow said flites to pass axially of said pins during reciprocation of said screw.

22. A method for use in forming an electrode comprising:
providing a barrel for receiving electrode materials comprising an active material and a polymer binder;
moving said received electrode materials axially within said barrel while mixing and kneading said electrode materials such that said polymer binder is fibrillated; and
receiving the mixture of electrode materials including said fibrillated polymer binder from the end of said barrel as said mixture is move axially in said barrel and continuously forming from said mixture a cohesive electrode component without bringing said polymer binder to the melt stage; said forming being carried out with a hob member having an outer surface and a surrounding die having an inner surface; said outer and inner surfaces of said die and hob defining an adapter zone through which said mixture first passes and a smoothing zone following said adaptor zone; the ratio of the length of said adapter zone in the axial direction to the barrel diameter being in the range of 0.5 to 0.75 and the ratio of the length of said smoothing zone to the thickness of said cohesive electrode component being less than about 3.5.

23. A method in accordance with claim 22 wherein:
the amount of polymer binder is less than about 50 percent by weight of the materials constituting said cohesive electrode, component.

24. A method in accordance with claim 23 wherein: the amount of polymer binder is less than about 10 percent by weight of the materials constituting said cohesive component.

25. A method in accordance with claim 22 wherein:
said cohesive electrode component is in the form of a sheet.

26. A method in accordance with claim 22 wherein:
said cohesive electrode component is in the form of a tube.

27. A method in accordance with claim 22 further comprising:
feeding said electrode materials into said barrel at different positions along the axis of said barrel.

28. A method in accordance with claim 24 further comprising:
premixing said electrode materials;
and feeding said premixed electrode materials into said barrel at a common position.

29. A method in accordance with claim 22 wherein:
said outer surface of said hob includes: a first truncated conical surface portion closest said barrel which increases in radius in moving away from said barrel and which with said inner surface of said die forms said adapter zone; and a second cylindrical surface portion which extends from said first surface portion and which forms with said inner surface of said die said smoothing zone which is annular.

30. A method for use in forming an electrode comprising:
providing a barrel for receiving electrode materials comprising an active material and a polymer binder;
moving said received electrode materials axially within said barrel while mixing and kneading said electrode materials such that said polymer binder is fibrillated; and
receiving the mixture of electrode materials including said fibrillated polymer binder from the end of said barrel as said mixture is move axially in said barrel and continuously forming from said mixture a cohesive electrode component without bringing said polymer binder to the melt stage; said forming being carried out with a hob member having an outer surface and a surrounding die having an inner surface; said outer and inner surfaces of said die and hob defining an adapter zone through which said mixture first passes and a smoothing zone following said adaptor zone; the ratio of the length of said adapter zone in the axial direction to the barrel diameter being less than about 1.25; and the ratio of the length of said smoothing zone to the thickness of said cohesive electrode component being in the range of about 3 to 4.

31. A method in accordance with claim 30 wherein:
the outer surface of said hob comprises: inclined upper and lower flat surfaces which incline toward the axis of the barrel in proceeding away from the barrel.

32. A method in accordance with claim 22 wherein:
said step of moving said electrode materials includes: for contacting said electrode materials with surfaces and passing other surfaces closely adjacent said contacting surfaces so as to create a wiping action which acts to fibrillate the polymer binder material in the region between said contacting surfaces and other surfaces.

33. A method in accordance with claim 22 wherein:
said step of moving said electrode materials comprises: providing a screw which extends along the axis of said barrel and which has along its length one or more discontinuous kneading flites; providing a first set of pins situated along the length of said barrel and extending radially inwardly to positions adjacent said flites; and
rotating and reciprocating said screw so that the surfaces of the flites pass closely adjacent said pins so as provide a wiping action, thereby causing kneading of the electrode materials therebetween and resultant fibrillation of the polymer binder material.

34. A method in accordance with claim 33 wherein:
said step of moving said electrode material further comprises: providing one or more pushing flites situated along the length of said screw and adapted to push said materials along the axis of said barrel as said screw rotates and reciprocates.

* * * * *

UNITED STATES PATENT AND TRADEMARK OFFICE
CERTIFICATE OF CORRECTION

PATENT NO. : 4,976,904

DATED : December 11, 1990

INVENTOR(S) : John M. Bilhorn

It is certified that error appears in the above-identified patent and that said Letters Patent is hereby corrected as shown below:

```
Col. 3,  line 17.  After "formed" insert -- . --
Col. 4,  line 53.  Delete "of the" first occurrence
Col. 5,  line 20.  Change "faciliate" to -- facilitate --
Col. 5,  line 35.  Change "22a'" to -- 22a" --
Col. 6,  line 51.  Delete "is"
Col. 10, line 50.  Change "move" to -- moved --
Col. 11, line 15.  Change "24" to -- 22
Col. 12, line 35.  After "as" insert -- to --
```

Signed and Sealed this

Twenty-eighth Day of July, 1992

*Attest:*

DOUGLAS B. COMER

*Attesting Officer*   *Acting Commissioner of Patents and Trademarks*